Oct. 8, 1963 H. A. THELEN 3,106,027
INSTRUCTIONAL DEVICE
Filed July 2, 1962 2 Sheets-Sheet 1
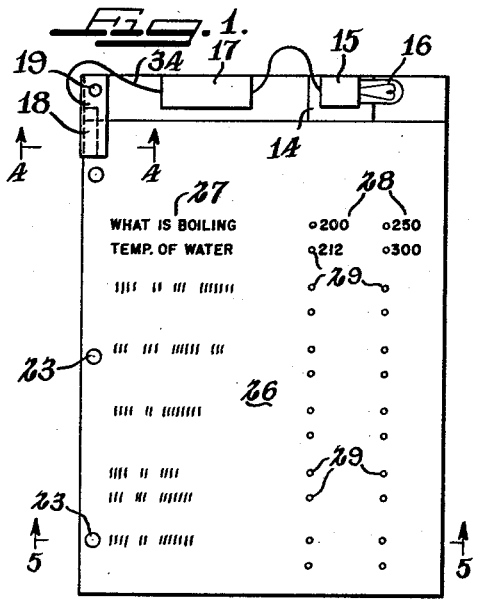
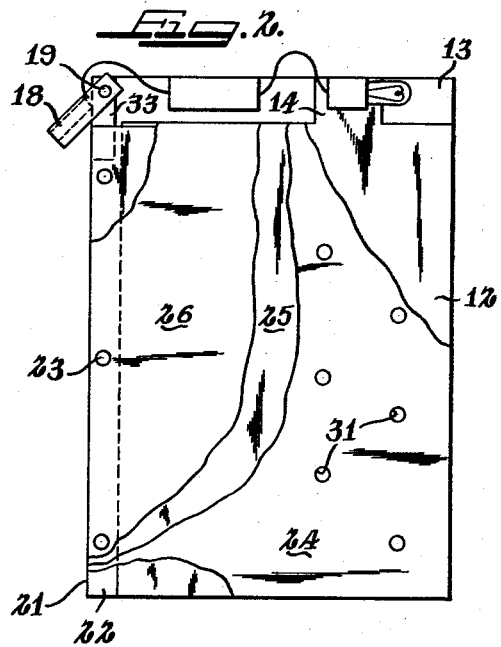
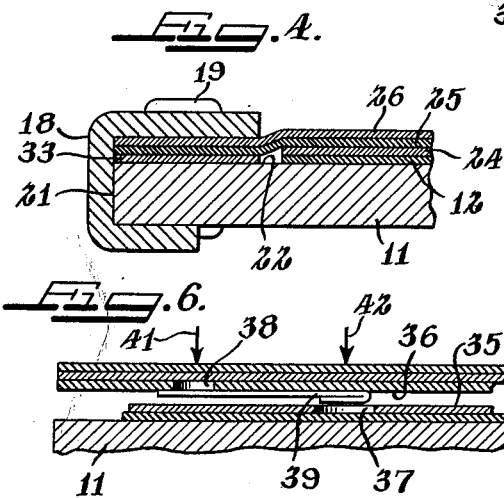
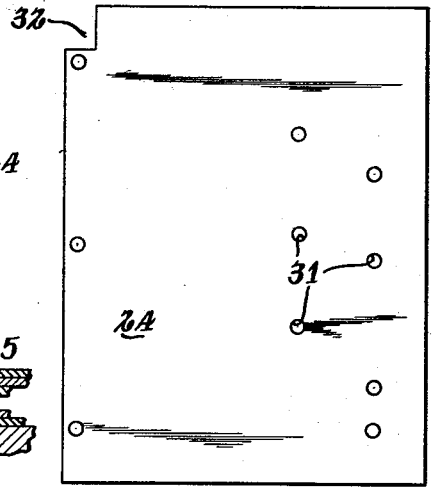
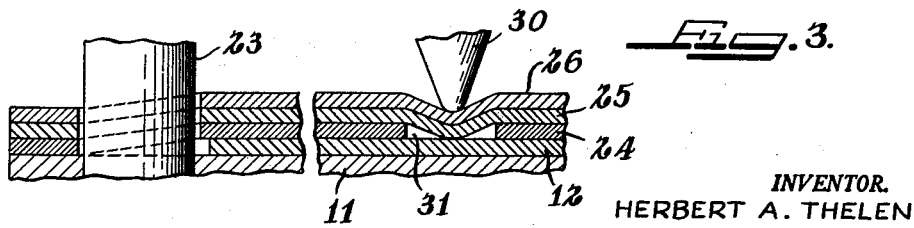
INVENTOR.
HERBERT A. THELEN
BY
Samuel W. Kipnis.
Atty.

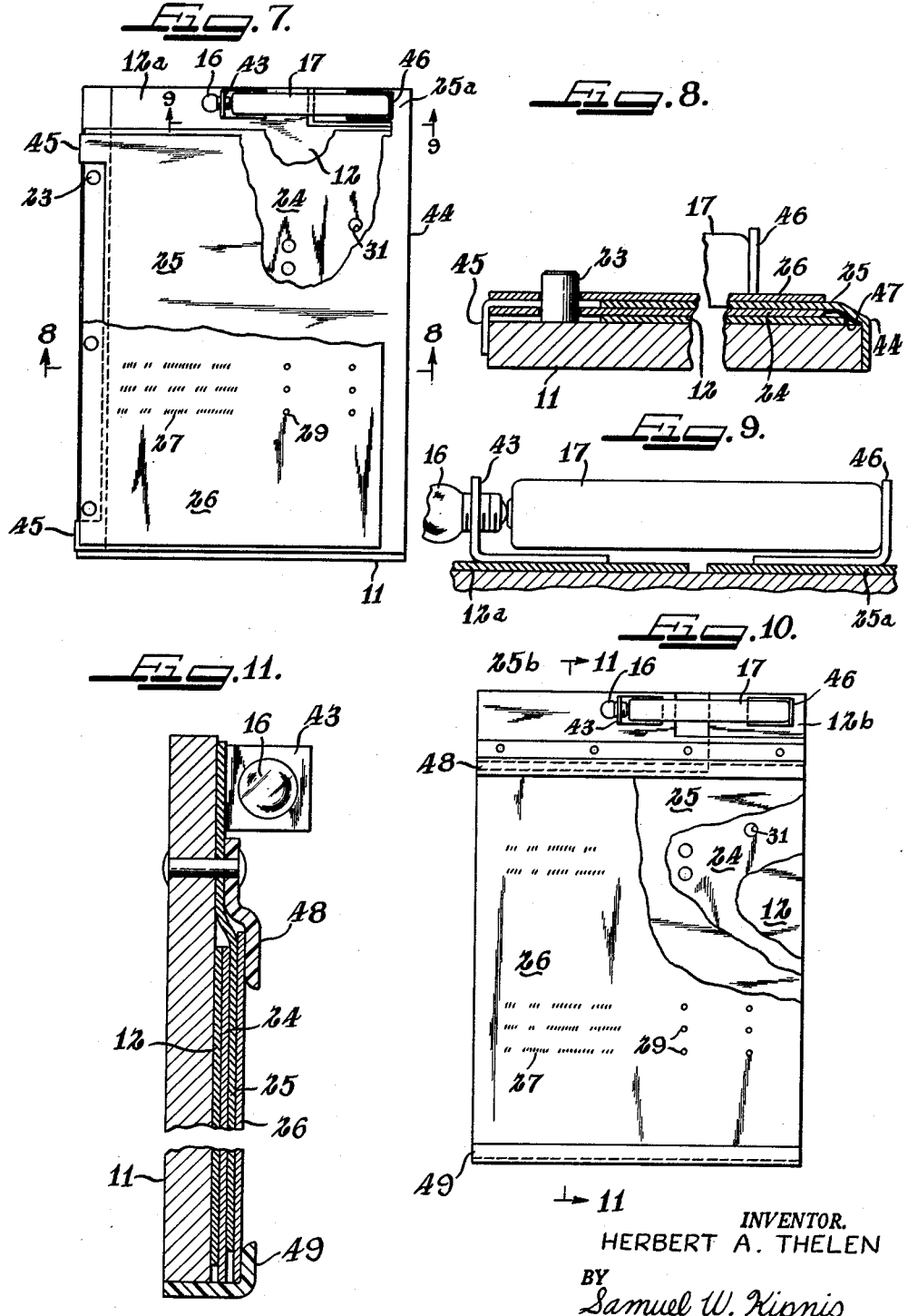

United States Patent Office 3,106,027
Patented Oct. 8, 1963

3,106,027
INSTRUCTIONAL DEVICE
Herbert A. Thelen, 5655 S. Drexel Ave., Chicago, Ill.
Filed July 2, 1962, Ser. No. 206,779
12 Claims. (Cl. 35—9)

This invention relates to improvements in instructional and self testing devices and is particularly concerned with a sensing device consisting of a series of sheets including a work sheet containing questions and selectable answers which is arranged over a pair of normally spaced apart electric conductor sheets having a control sheet between them and which are adapted to complete an electric circuit to a signal device when a proper answer is selected by a user.

Known prior devices of this character are of a kind that include cards or sheets that are each punched with holes so as to permit a feeler or other implement to pass through aligned holes and complete the circuit of the device through some means located below the cards. Others include specially constructed implements having signal means incorporated therein which is actuated when a pair of normally open terminals are contacted.

The present device is of a nature that includes a work sheet and a control sheet upon both or one of which are imprinted, or otherwise reproduced, a corresponding series of write-in questions, pictures, diagrams, objective questions, etc. These sheets may be alike in all detail with the exception that the work sheet bears indices to be engaged manually by an implement for indicating the answer selected, whereas the control sheet has punched perforations in areas corresponding to and aligned with the areas of the work sheet bearing the correct answers to the questions, etc. A first electric conductive sheet underlies the control sheet and the work and control sheets are separated by a second electric conductor sheet. This arrangement, which includes a source of electric power and signal means, results in a normally open circuit in which the conductor sheets are electrically connected when an area of the work sheet and the underlying electric control sheet in register with a perforation is pressed into a perforation to close the circuit.

The device may be used as a learning or as a testing device. In the latter event the user will mark selected answers on the work sheet and then place same over the conductor covered control sheet. By then depressing the work sheet in the marked areas he will be informed of the number of correct answers he has given upon operation of the signal each time a correct answer is indicated. In the former instance of use, he will arrange the sheets as aforesaid without having previously marked the work sheet. Then, by selective depression of answer areas he will learn the correct answer upon operation of the signal means when correct answer areas are depressed. These operations can be repeated any number of times and at the conclusion of or during the learning period the user may mark the correct answers on the work sheet for future reference.

It is therefore an object of the invention to provide a novel device of the character referred to.

Another object is to provide a novel base structure with electric conductor means thereon and signal transmission means associated therewith.

Another object is to provide a sensing device wherein a control sheet forming a part thereof is wholly concealed from view when the device is in use.

Another object is to provide a sensing device of the character referred to which is not expensive to manufacture and use, which is highly efficient in use and easy to use.

The structures and means by which the above noted and other objects and advantages of the invention are attained will be described in the following specification, taken in conjunction with the accompanying drawings, showing preferred illustrative embodiments of the invention, in which:

FIG. 1 is a top or plan view of an exemplary form sensing device embodying the features of the invention.

FIG. 2 is a view similar to FIG. 1, showing portions of successive sheets broken away.

FIG. 3 is a plan view of the control sheet.

FIG. 4 is an enlarged detail sectional view taken substantially on line 4—4 of FIG. 1.

FIG. 5 is an enlarged fragmentary detail sectional view taken substantially along line 5—5 of FIG. 1.

FIG. 6 is a fragmentary detail sectional view similar to FIG. 5, showing a modified form of construction.

FIG. 7 is a view similar to FIG. 2 showing another form of construction.

FIG. 8 is an enlarged transverse sectional view, taken on line 8—8 of FIG. 7.

FIG. 9 is a detail sectional view taken on line 9—9 of FIG. 7.

FIG. 10 is a view similar to FIG. 7, showing another exemplary form of the device.

FIG. 11 is a transverse sectional view taken substantially on line 11—11 of FIG. 10.

Referring to the accompanying drawings, and particularly to the exemplary embodiment of the invention shown in FIGS. 1 through 5, the sensing device includes a substantially rectangular base 11, which may be paperboard, thin wood, plastic or other electrical insulation material. A layer of electric conductor material 12 is firmly mounted or otherwise provided on the top surface of said base. This layer preferably terminates short on one end edge of the base to leave margin 13 uncovered and it has a tongue or other extension 14 projecting toward said edge. A socket 15 for a lamp 16 is mounted on and has one of its terminals electrically connected to said tongue. The exposed margin 13 of the base also mounts a battery 17, which preferably is removable so as to facilitate its replacement, and a clamp 18, hereinafter referred to in detail, is pivotally secured at 19 to said margin adjacent to one side edge 21 of the base. It is to be noted that foil 12 also terminates short of the side edge 21 of said base so as to leave an exposed base margin 22 on which a plurality of upstanding posts 23 are secured.

A plurality of sheets of material are arranged in sequence over the top surface of the conductor carrying base. As best shown in FIG. 2, these include a control sheet 24 which is laid directly over conductor layer 12, a second layer of conductor material 25 and finally a work sheet 26. Preferably, both the control sheet and the work sheet bear identical questions and selectable answers such as, for example, the question 27 and answers 28 which are imprinted or otherwise produced thereon. On the work sheet 26 there is a dot 29 or similar indicia associated with each selectable answer 28, whereas the control sheet has a punched perforation 31 therein adjacent to the correct one of such selectable answers. If desired, the control sheet can be unprinted but coded to a specific work sheet.

In this embodiment the sheets 24, 25 and 26 are all perforated along one edge to receive the posts 23 therethrough for aligning the sheets and particularly to maintain the selectable answers on the work and control sheets in registering alignment. Also, the control sheet has its upper lefthand corner removed, as at 32, so as to lie clear of a corner electric contact 33 underlying clamp 18. This permits the related corner of the second conductor sheet 25 to overlie and be clamped tightly against contact 33 when the clamp 18 is moved thereover as shown in FIGS. 1 and 4 to complete an electric connection between said conductor sheet 25 and contact 33, the latter being connected, as by wire 34, to one terminal of a source of electric current such as the battery 17 shown, the other terminal of which is connected to the remaining terminal of socket 15. Obviously an outside source of electric current can be provided.

When the sheet material is arranged in the manner noted hereinabove, the user will press down upon one indicia 29 associated with a selected answer with a suitable implement such as a pencil 30. Should a correct answer have been selected, the engaged area of the work sheet 26 and the underlying area of the second conductor sheet 25 are depressed into the aligned perforation 31 sufficiently to carry the conductor sheet 25 into electric contact with the conductor layer 12 on the base. This closes the circuit to lamp 16 causing same to be lighted. Should an incorrect answer have been selected, the circuit is not completed owing to the absence of a perforation 31 in the control sheet in register with the incorrect answer selected.

It should be quite apparent that the sensing device can be used repeatedly and that different work and control sheet combinations can be arranged thereon quickly thereby making the device adaptable for use as a self-learning device, a testing device or as a game device. The thickness of the control sheet 24 affords means to maintain the conductor sheets 12, 25, out of contact one with the other at all times except when an area of the uppermost sheet is depressed into a perforation in the work sheet and the conductor sheet 25 has sufficient body to return to its initial non-depressed position following removal of the depressing implement. Obviously, an audible signal can replace the visual signal 16.

The FIG. 6 disclosure is similar to the one previously described and like numerals are used to identify corresponding parts. In this embodiment it is required that two indices on the work sheet be depressed simultaneously in order to complete the electric circuit to the signal. As shown, the assembly includes two control sheets 35, 36 having selectively placed perforations 37, 38 respectively, and provided with bridging strips of foil 39 interposed between them. These foil strips may be adhesively coated on their top surfaces so as to be secured selectively to the under surface of the upper work sheet. In use, the operator, if the correct answer is selected, will depress the work sheet as indicated at 41, to make electric contact through perforation 38 between the top conductor sheet 25 and strip 39. In order to complete the circuit, the user must also depress the work sheet in the area indicated at 42 so as to depress the other end of strip 39 into perforation 37 and into electric contact with the lower conductor sheet or layer 12. As explained hereinabove, the control sheets 35, 36 normally hold the circuit open.

Referring now to the exemplary embodiment of the device shown in FIGS. 7, 8 and 9, wherein like numerals are used to identify corresponding parts, the assembly comprises a first conductor sheet 12 mounted firmly on base 11 and terminating at one edge short of the upstanding posts 23. This sheet has a tab extension 12a on which a bracket 43 is secured. A control sheet 24 having selectable perforations 31 therein is laid over the sheet 12 and a second conductor sheet 25 is laid thereover to conceal same. In this embodiment the second conductor sheet 25 is hingedly mounted, as at 44, to one edge of base 11 and preferably carries on its opposite edge a pair of flanges 45 adapted to be engaged over the opposed base edge to retain said sheet flat over control sheet 24.

The hinged margin of said second conductor sheet 25 has a tab extension 25a upon which is secured a companion bracket 46. The brackets 43, 46 afford mounting for a battery 17 and lamp 16, thus providing an electric circuit in which the sheets 12 and 25 are a part. In order to prevent a short circuit between the hinged margin of conductor sheet 25 and the underlying margin of the first conductor sheet 12, the opposed face of the margin of sheet 25 may carry a strip of electric insulation material, such as the strip of pressure sensitive material 47 illustrated in FIG. 8. The operation of this device is like the one previously described.

In the FIGS. 10–11 disclosure, the device illustrated functions in the same manner as those previously described and like numbers identify corresponding parts. In this embodiment the second conductor sheet 25 is hingedly secured along its upper or end edge and it includes an edge flap 25b upon which one lamp-battery bracket 43 is secured. An offset flanged strip 48 of non-conductive material is secured over said second conductor strip, along the line of its hinge connection for receiving tucked therebeneath the upper end edge of the work sheet 26. The opposed edge of the base 11 carries an opposed flange 49 that affords means for receiving the free edge margins of all of the sheets. These two flanges provide means for retaining the work and control sheets and the lower edge of the second conductor sheet in place and in a manner to permit their ready insertion and removal.

From the foregoing description it is believed that the nature of my invention and the manner in which it is to be carried out will be readily apparent to those skilled in this art.

Having thus described my invention, what I claim as new and desire to secure by Letters Patent is:

1. An electric instruction device comprising a sensing device equipped with an open electric circuit, said device comprising a rigid base, a plurality of sheet receiving posts on one edge of said base, an electric conductor sheet connected in said circuit overlying substantially the entire top surface of said base and spaced from said posts, a non-conductor control sheet threaded on said posts and overlying the electric conductor sheet, a non-perforated second electric conductor sheet threaded on said posts and having coextensive relationship with and lying flat over the control sheet to normally conceal same from view, clamp means connecting said second conductor sheet in said circuit, said control sheet having a plurality of perforations arranged in predetermined positions therein and normally holding the conductor sheets spaced to prevent electric contact through the perforations, and a work sheet having questions and suggestive answers and indices arranged thereon in predetermined positions some of which are in register with apertures in the control sheet, said work sheet and second conductor sheet being responsive to applied pressure in the area of an underlying perforation to flex sufficiently to carry the second conductor sheet into electric contact with the first conductor sheet to close the circuit.

2. An electric instruction device comprising a sensing device comprising a non-conductive base, a plurality of sheet receiving posts on one edge of said base, an electric conductor sheet connected in said circuit overlying the top surface of said base and spaced from said posts, a non-conductor control sheet threaded on said posts and overlying the electric conductor sheet, a non-perforated second electric conductor sheet threaded on said posts and overlying the control sheet to normally conceal same from view, means connecting said second conductor sheet in said circuit, said control sheet having a plurality of perforations arranged in predetermined positions therein and normally holding the conductor sheets spaced to prevent electric contact through the perforations, and a work sheet having indices arranged thereon in predetermined positions some of which are in register with apertures in the control sheet, said work sheet and second conductor sheet being responsive to applied pressure in the area of an underlying perforation to flex sufficiently to carry the second conductor sheet into electric contact with the first conductor sheet to close the circuit.

3. An electric instruction device comprising a sensing device equipped with a signal device and an open electric circuit, said sensing device comprising an electric conductor sheet connected in said circuit, a non-conductor control sheet overlying the electric conductor sheet, an imperforated second electric conductor sheet substantially the same size as and lying flat over the control sheet to normally conceal same from view, means to secure said sheets in place, means connecting said second conductor sheet in said circuit, said control sheet having spaced perforations therein and normally holding the conductor sheets spaced to prevent electric contact through the perforations, and a work sheet having indices arranged thereon some of which are in register with the apertures in the control sheet, said work sheet and second conductor sheet being responsive to applied pressure in the area of an indicia overlying a perforation to flex sufficiently to carry the second conductor sheet into electric contact with the first conductor sheet to close the circuit.

4. An electric instructional device comprising a sensing device equipped with an open electric circuit including a first electric conductor sheet, a control sheet arranged flat over the conductor sheet and having a plurality of perforations arranged in predetermined positions therein, an imperforated second electric conductor sheet substantially the same size as the control sheet laid flat over the control sheet and normally concealing said control sheet, and a flexible sheet overlying the second electric conductor sheet having a plurality of indices arranged in predetermined positions thereon some of which are in alignment with perforations in the control sheet, said second electric conductor sheet being connected in said open electric circuit and being responsive to application of pressure on an indicia on the work sheet overlying a perforation in the control sheet to effect electrical engagement between said second and first conductor sheets to close the circuit.

5. The device recited in claim 4, in which the device includes means to retain the sheets in place.

6. The device recited in claim 4 in which means connecting the second electric conductor sheet in the circuit comprises a clamp.

7. An electric instructional device comprising a sensing device equipped with an open electric circuit including a first electric conductor sheet and signal means, a control sheet arranged flat over the conductor sheet and having a plurality of perforations arranged in predetermined positions therein, an imperforated second electric conductor sheet substantially the same size as the control sheet laid flat over the control sheet, and a flexible sheet overlying the second electric conductor sheet having a plurality of indices arranged in predetermined positions thereon, said second electric conductor sheet being connected in said open electric circuit and being responsive to application of pressure on an indicia overlying a perforation in the control sheet to effect electrical engagement between said second and first conductor sheets to close the circuit to said signal means.

8. An electric instructional device comprising a sensing device equipped with an open electric circuit including signal means and a first electric conductor sheet, a pair of control sheets arranged flat over the conductor sheet and each having a plurality of non-aligned perforations arranged in predetermined positions therein, an electric conductor strip between said control sheets bridging selected perforations in each, a second electric conductor sheet laid flat over and covering the upper one of said control sheets, and a flexible sheet overlying the second electric conductor sheet having a plurality of indices arranged in predetermined positions thereon some of which are in registering alignment with selected perforations, said second electric conductor sheet being connected in said open electric circuit and being responsive to application of pressure on selected indices on the work sheet overlying a common electric conductor strip to effect electrical engagement between said strip and said second and first conductor sheets to close the circuit.

9. An electric instructional device comprising a sensing device equipped with an open electric circuit including a first electric conductor sheet, a control sheet arranged flat over the conductor sheet and having a plurality of perforations arranged in predetermined positions therein, a non-perforated second electric conductor sheet of the same size as the control sheet laid flat over the control sheet and normally concealing said control sheet, a flexible sheet overlying the second electric conductor sheet having a plurality of indices arranged in predetermined positions thereon some of which are in alignment with perforations in the control sheet, said second electric conductor sheet being connected in said open electric circuit and being responsive to application of pressure on an indicia on the work sheet overlying a perforation in the control sheet to effect electrical engagement between said second and first conductor sheets to close the circuit, and means to retain said sheets in a stack.

10. An electric instructional device comprising a sensing device equipped with an open electric circuit including a first electric conductor sheet, a control sheet arranged flat over the conductor sheet and having a plurality of perforations arranged in predetermined positions therein, a non-perforated second electric conductor sheet of the same size as the control sheet laid flat over the control sheet and normally concealing said control sheet, a flexible sheet overlying the second electric conductor sheet having a plurality of indices arranged in predetermined positions thereon some of which are in alignment with perforations in the control sheet, said second electric conductor sheet being connected in said open electric circuit and being responsive to application of pressure on an indicia on the work sheet overlying a perforation in the control sheet to effect electrical engagement between said second and first conductor sheets to close the circuit, and means to retain the work and control sheets in registering alignment.

11. An electric instructional device comprising a sensing device equipped with an open electric circuit including a base, a first electric conductor sheet on said base, a control sheet arranged flat over the conductor sheet and having a plurality of perforations arranged in predetermined positions therein, a non-perforated second electric conductor sheet hingedly connected to said base and laid flat over the control sheet and normally concealing said control sheet, said second electric conductor sheet being substantially the same size as the control sheet, a flexible sheet overlying the second electric conductor sheet having a plurality of indices arranged in predetermined positions thereon some of which are in alignment with perforations in the control sheet, said second electric conductor sheet being connected in said open electric circuit and being responsive to application of pressure on an indicia on the work sheet overlying a perforation in the control sheet to effect electrical engagement between said second and first conductor sheets to close the circuit, and means on said base to retain the sheets in a stack on said base.

12. An electric instructional device comprising a sensing device equipped with an open electric circuit including a base, a first electric conductor sheet on said base, a control sheet arranged flat over the conductor sheet and having a plurality of perforations arranged in predetermined positions therein, a non-perforated second electric conductor sheet of a size responding substantially to the size of the control sheet hingedly connected to said base and laid flat over the control sheet and normally concealing said control sheet, and a flexible sheet overlying the second electric conductor sheet having a plurality of indices arranged in predetermined positions thereon some of which are in alignment with perforations in the control sheet, said second electric conductor sheet being connected in said electric circuit and being responsive to application of pressure on an indicia on the work sheet overlying a perforation in the control sheet to effect electrical engagement between said second and first conductor sheets to close the circuit.

References Cited in the file of this patent

UNITED STATES PATENTS

| | | |
|---|---|---|
| 2,734,954 | Kidd | Feb. 14, 1956 |
| 2,943,399 | Davis | July 5, 1960 |
| 2,943,400 | Griswold | July 5, 1960 |
| 3,057,082 | Wellington et al. | Oct. 9, 1962 |